(12) United States Patent
Schmonsees et al.

(10) Patent No.: US 10,461,394 B1
(45) Date of Patent: Oct. 29, 2019

(54) ANTENNA ENCLOSURE, BRACKETS, AND DAS SYSTEM

(71) Applicant: BEAM WIRELESS, INC., Greenville, SC (US)

(72) Inventors: Kevin Thomas Schmonsees, Holly Springs, NC (US); Steven James Heglar, Apex, NC (US); Kevin Eads, Gastonia, NC (US)

(73) Assignee: BEAM WIRELESS, INC., Greenville, SC (US)

( * ) Notice: Subject to any disclaimer, the term of this patent is extended or adjusted under 35 U.S.C. 154(b) by 0 days.

(21) Appl. No.: 15/971,266

(22) Filed: May 4, 2018

(51) Int. Cl.
  *H01Q 1/12* (2006.01)
  *H04M 1/02* (2006.01)
  *H01Q 1/48* (2006.01)
  *H01Q 1/42* (2006.01)

(52) U.S. Cl.
  CPC ............. *H01Q 1/1207* (2013.01); *H01Q 1/42* (2013.01); *H01Q 1/48* (2013.01); *H04M 1/026* (2013.01)

(58) Field of Classification Search
  CPC .. H01Q 1/1207; H01Q 1/1214; H01Q 1/1221; H01Q 3/02; H01Q 3/04; H01Q 3/06
  See application file for complete search history.

(56) References Cited

U.S. PATENT DOCUMENTS

| 2,731,225 | A | * | 1/1956 | Cayo | H01Q 1/1221 248/314 |
| 4,839,660 | A | * | 6/1989 | Hadzoglou | H01Q 1/1207 343/715 |
| 5,619,215 | A | * | 4/1997 | Sydor | H01Q 3/08 343/765 |
| 2002/0133293 | A1 | * | 9/2002 | Goldman | G01S 19/14 701/469 |
| 2007/0290943 | A1 | * | 12/2007 | Fujimoto | H01Q 1/12 343/872 |
| 2015/0181645 | A1 | * | 6/2015 | Anderson | H01Q 1/22 361/814 |
| 2017/0069950 | A1 | * | 3/2017 | Kim | H01Q 1/125 |

* cited by examiner

*Primary Examiner* — Daniel Munoz
(74) *Attorney, Agent, or Firm* — JK Intellectual Property Law, PA

(57) ABSTRACT

A communications device may include an enclosure, mounting structure for mounting the enclosure in a predetermined orientation, an antenna bracket mounted to the enclosure, the antenna bracket having an antenna mounting portion, and an antenna mounted to the antenna mounting portion of the antenna bracket. The antenna bracket is configured so that when the enclosure is mounted in the predetermined orientation a ground plane of the antenna extends along a non-horizontal plane.

19 Claims, 12 Drawing Sheets

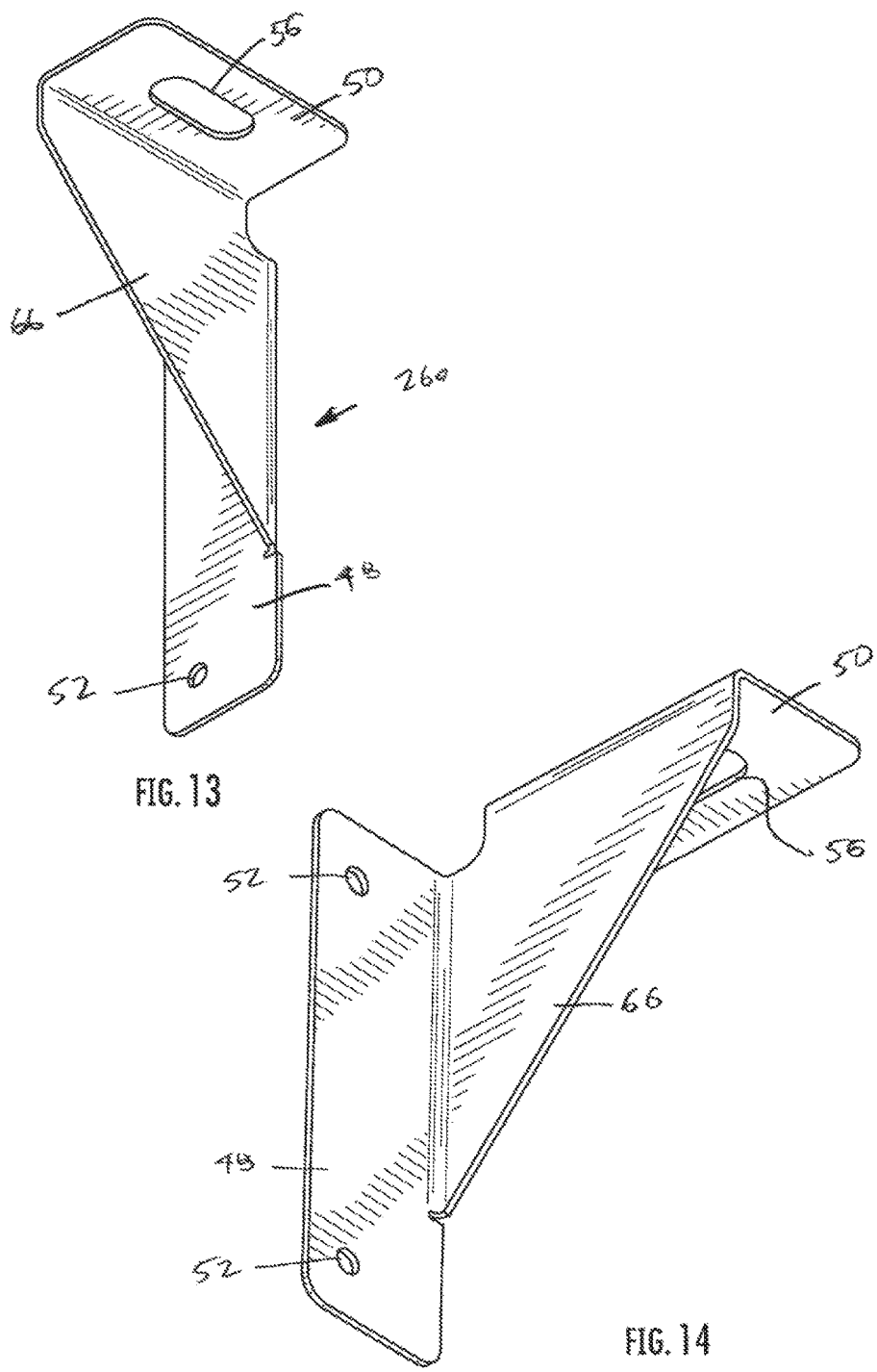

ANTENNA ENCLOSURE, BRACKETS, AND DAS SYSTEM

TECHNICAL FIELD

The present disclosure relates generally to communications systems, antennas, enclosures, distributed antenna systems, and components thereof.

BACKGROUND

Mobile communications devices communicate in various ways with multiple types of wireless networks. In mobile phone networks, telephones, computers, and other mobile communications devices typically communicate with the network via distributed transceiving microwave radio antennas. Each antenna installation communicates with telephones within its range (typically on the order of up to several miles), thereby forming a "cell" within a cellular network of at least partially overlapping cells. Mobile communications devices may communicate with such networks using voice, data, text messaging, etc. signals. Other communications networks such as Wi-Fi, WiMAX, Bluetooth, etc., also exist in which transceivers are set up to communicate wirelessly with mobile communications devices.

In locations such as stadiums, arenas, theaters, and the like where many people are gathered together, existing mobile phone network technologies are challenged to provide sufficient access to potentially tens of thousands of people, often arranged in a dense seating pattern. Attempts have been made to improve service by placing conventional mobile network communications antennas around perimeters of seating areas, along super-structures, in concourse areas, etc. Directional antennas have also been employed to target desired areas within such locations. However, even multiple conventional antennas in such a venue generally cannot provide sufficient coverage for large groups of users, and existing directional antennas are too large and therefore intrusive to locate sufficiently to provide desired coverage in such locations.

Accordingly, antennas and antenna systems that improve upon existing communications access, coverage, user volume, signal quality, or other features, addressing one or more drawbacks of existing systems, and/or that provide other benefits would be welcome.

SUMMARY

According to certain aspects of the disclosure, a communications device may include, for example, an enclosure having walls defining an interior area and an opening; a cover attachable to the opening so as to close the opening; mounting structure for mounting the enclosure in a predetermined orientation; an antenna bracket mounted to the enclosure in the interior, the antenna bracket being rigid and having an antenna mounting portion; and an antenna mounted to the antenna mounting portion of the antenna bracket. The antenna bracket is configured so that when the enclosure is mounted in the predetermined orientation a ground plane of the antenna extends along a non-horizontal plane. Various options and modifications are possible.

For example, the ground plane may be located in the antenna mounting portion, and the antenna may be an omnidirectional antenna and/or a mobile telephone communication antenna.

The antenna bracket may include a bracket mounting portion, the bracket mounting portion including a flange attached to one of the walls of the enclosure, and may also include a central portion between the bracket mounting portion and the antenna mounting portion. The antenna bracket may include at least one bend configured to permit selective adjustment of an orientation of the antenna mounting portion relative to the non-horizontal plane in which the ground plane is located.

The enclosure may include at least one opening through at least one of the walls, a communications cable extending through the opening, the communications cable being electrically connected to the antenna. Each opening may have an associated gland through which the communications cable enters the enclosure.

The at least one bend may include a surface irregularity to improve bendability along the at least one bend, the surface irregularity being at least one opening extending through the antenna bracket along the at least one bend or, for example, a plurality of stitch-cut openings along the at least one bend.

The mounting structure may include at least one enclosure bracket for mounting the enclosure in the predetermined orientation. The at least one enclosure bracket may include a first flange for attachment to the enclosure and a second flange for attachment to an environmental element. The environmental element may be a rail to which a plurality of seats may be mounted, the at least one enclosure bracket mounting the enclosure to the rail generally lower that the seats. The at least one enclosure bracket may be configured to reduce blockage of communications of a signal between the antenna and nearby users, for example, by including a reduced profile portion along a side of the enclosure to permit the signal to communicate with nearby users located in seats spaced in a direction generally along the side of the enclosure.

According to other aspects of the disclosure, a communications device may be mounted in a seating environment having multiple rows of seats arranged with a pitch between each adjacent pair of the rows, the communications device including, for example, an enclosure having walls defining an interior area and an opening; a cover attachable to the opening so as to close the opening; mounting structure for mounting the enclosure in a predetermined orientation along a row within the multiple rows of seats; an antenna bracket mounted to the enclosure in the interior, the antenna bracket being rigid and having an antenna mounting portion; and an antenna mounted to the antenna mounting portion of the antenna bracket. The antenna bracket is configured so that when the enclosure is mounted in the predetermined orientation a ground plane of the antenna extends along a non-horizontal plane related to the pitch so that a signal of the antenna is available to seats within the multiple rows located in front of and behind the enclosure. Various options and modifications are possible.

For example, the ground plane may be located in the antenna mounting portion, and the antenna may be an omnidirectional antenna.

The antenna bracket may include at least one bend configured to permit selective adjustment of an orientation of the antenna mounting portion relative to the non-horizontal plane in which the ground plane is located. The at least one bend may include a surface irregularity to improve bendability along the at least one bend, such as an opening or a plurality of stitch-cut openings along the at least one bend.

The mounting structure may include at least one enclosure bracket for mounting the enclosure in the predetermined orientation, the at least one enclosure bracket being configured to reduce blockage of communications of a signal between the antenna and nearby users.

The at least one enclosure bracket includes a reduced profile portion along a side of the enclosure to permit the signal to communicate with nearby users located in seats spaced in a direction generally along the side of the enclosure. The non-horizontal plane may be angled from a horizontal direction by an amount substantially corresponding to the pitch. A plurality of the communications devices may be distributed throughout the multiple rows so as to provide coverage to at least a substantial amount of the seats in the seating environment.

According to other aspects of the disclosure, an antenna mounting bracket may be used for a mounting an antenna of a communications device in an enclosure having walls defining an interior area, the antenna mounting bracket including, for example, a bracket mounting portion for attaching the antenna mounting bracket to the interior area in a predetermined orientation; an antenna mounting portion for receiving the antenna, the antenna mounting portion being a ground plane for the antenna; a central portion between the bracket mounting portion and the antenna mounting portion; the bracket mounting portion. The antenna mounting portion and the central portion are configured so that when the antenna mounting bracket is attached to the interior in the predetermined orientation the ground plane of the antenna extends along a non-horizontal plane. As above, various options and modifications are possible.

For example, the antenna bracket may include at least one bend configured to permit selective adjustment of an orientation of the antenna mounting portion relative to the non-horizontal plane in which the ground plane is located. Also, the at least one bend may include a surface irregularity to improve bendability along the at least one bend, the surface irregularity including an opening or a plurality of stitch-cut openings along the at least one bend.

BRIEF DESCRIPTION OF THE DRAWINGS

More details of the present disclosure are set forth in the drawings.

FIG. 13 is a right side isometric view of a right hand enclosure mounting bracket.

FIG. 14 is a left side isometric view of the right hand enclosure mounting bracket of FIG. 13.

DETAILED DESCRIPTION

Figure 1:
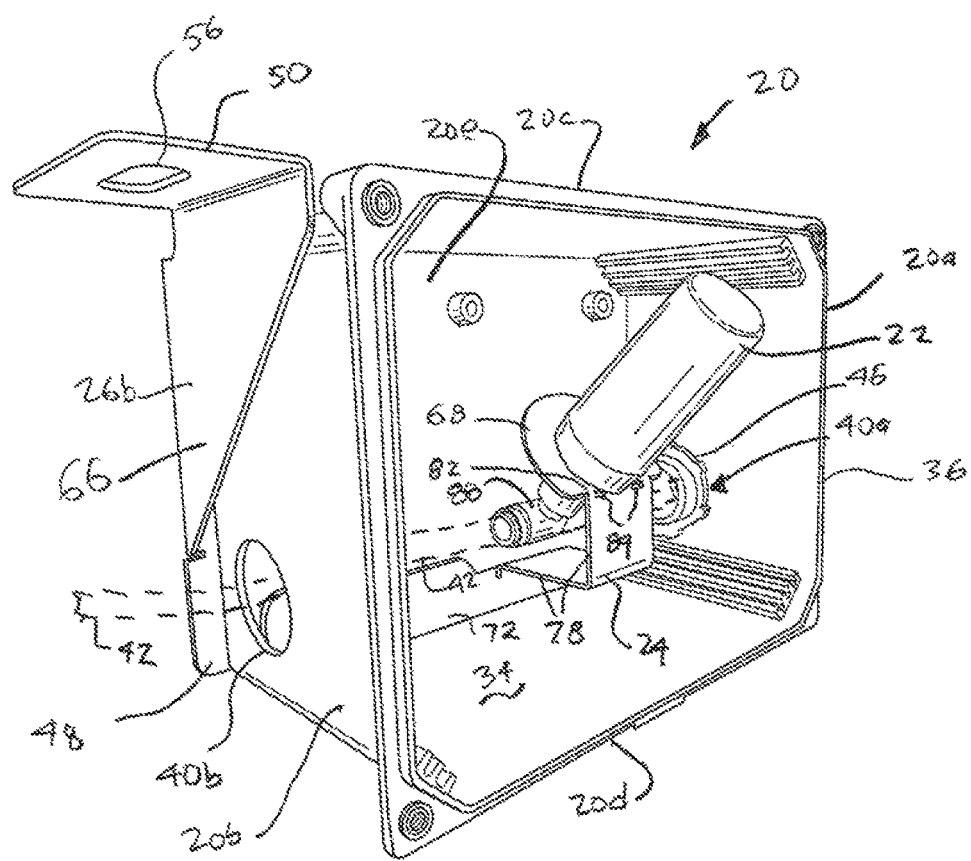
FIG. 1 is an isometric view of an antenna enclosure with its cover removed, according to one embodiment of the present invention.
Figure 2:
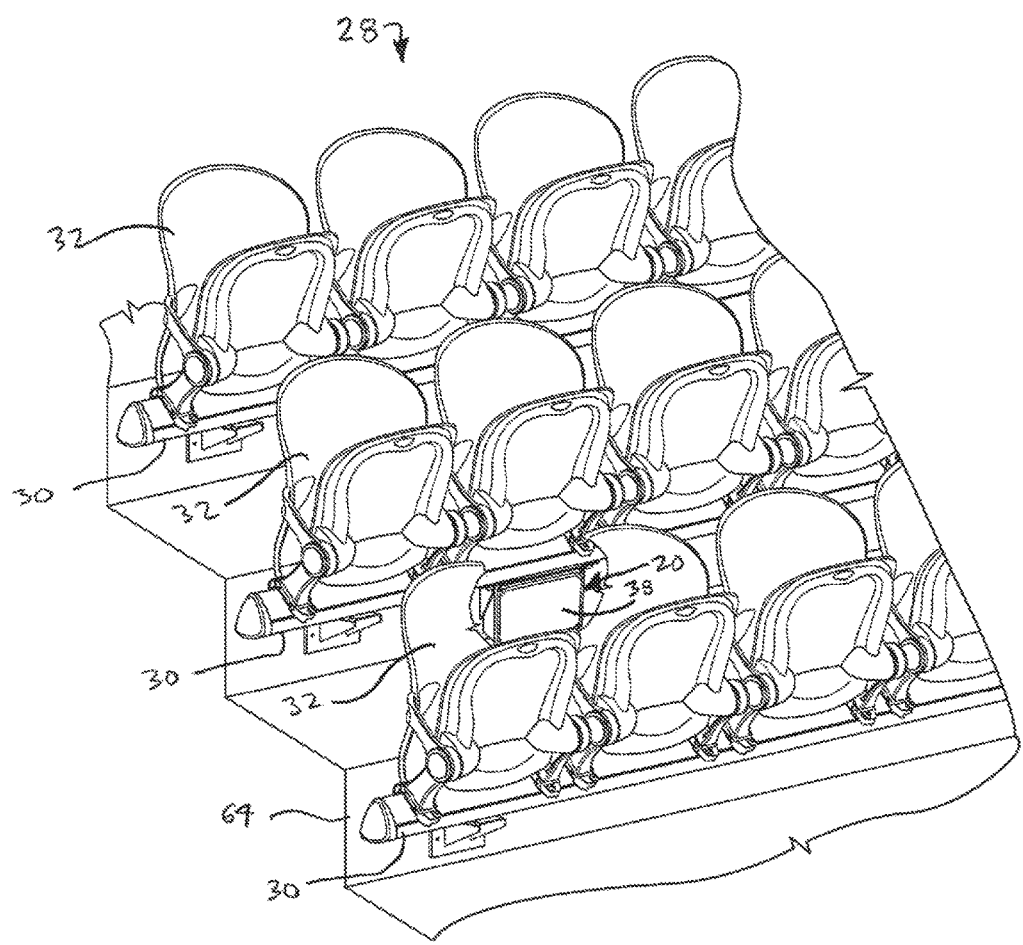
FIG. 2 is an isometric view of the antenna enclosure of FIG. 1 mounted within a section of seats.
Figure 3:
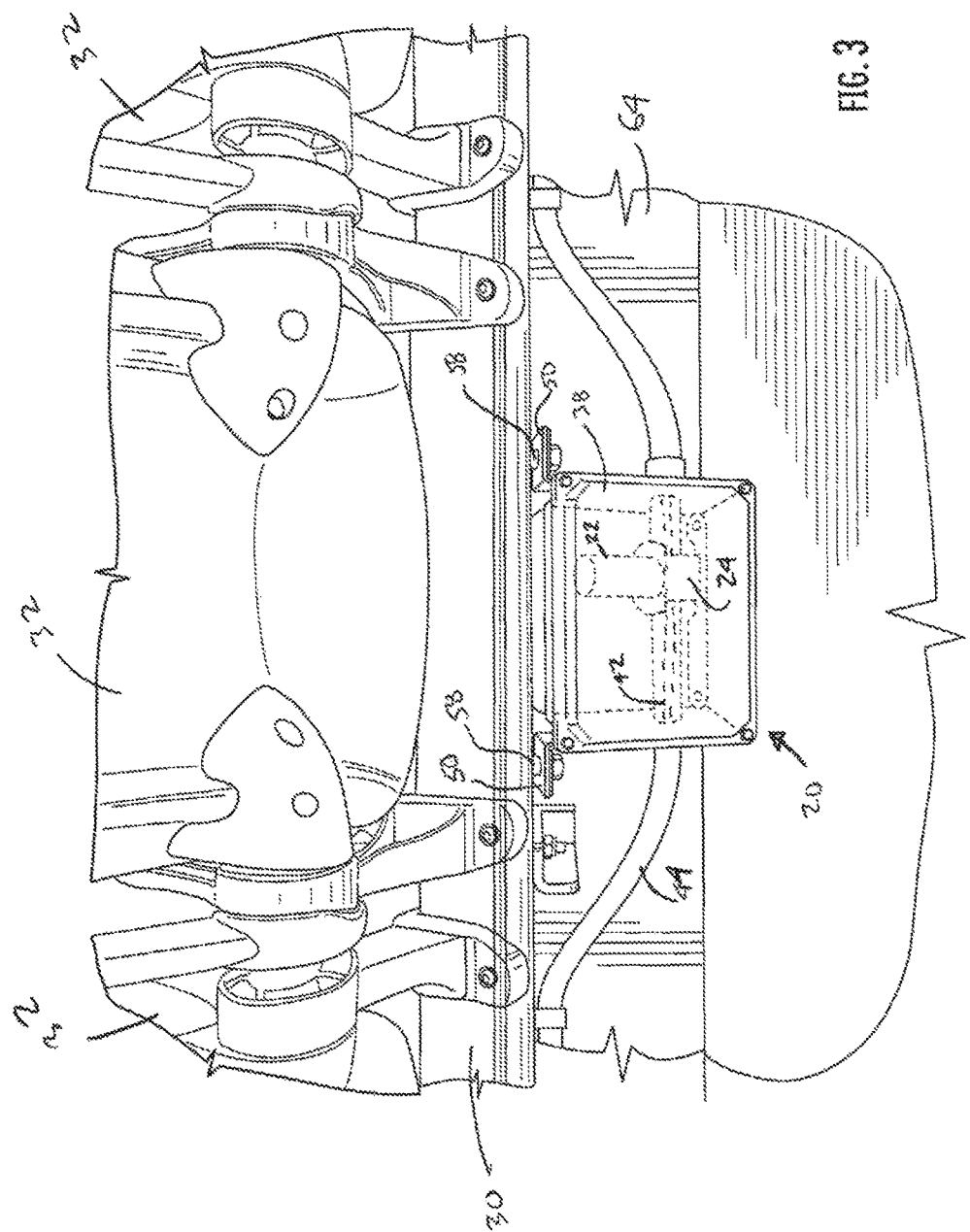
FIG. 3 is an isometric close-up view of the antenna enclosure of FIG. 2 mounted to a rail under a seat.
Figure 4:
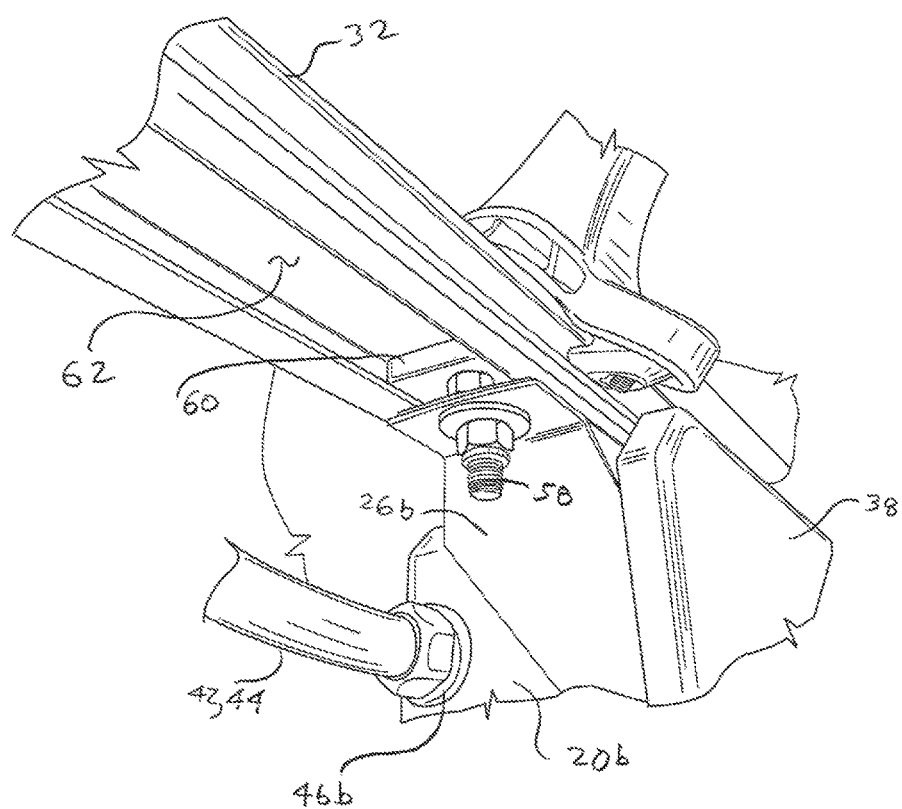
FIG. 4 is an isometric close-up view of antenna enclosure of FIG. 3, showing details of the mount to the rail.
Figure 5:
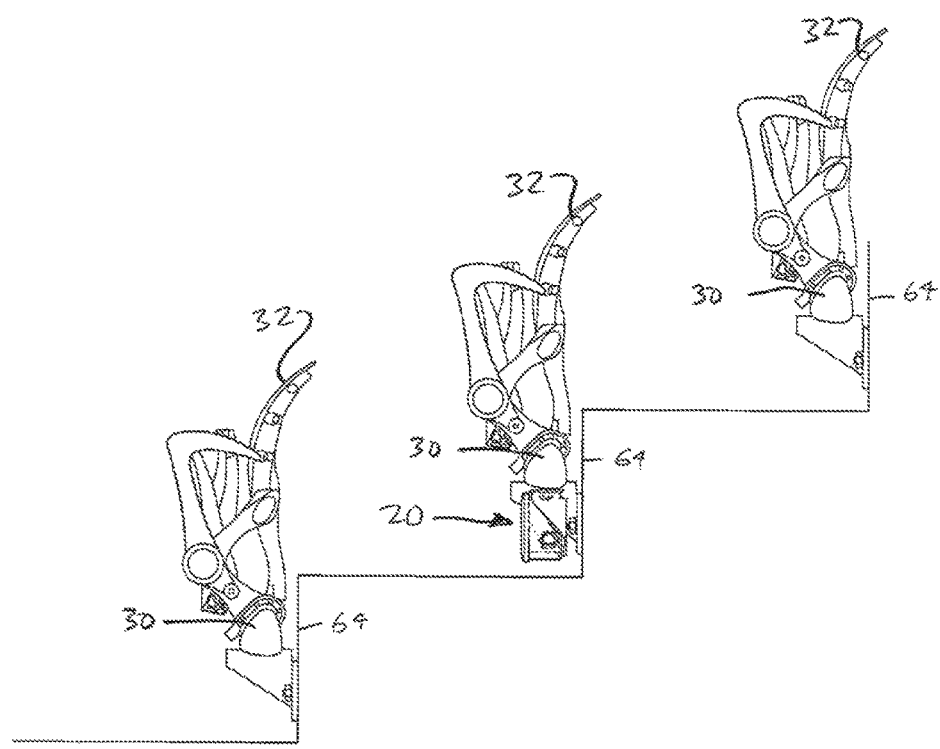
FIG. 5 is a side schematic view of the section of seats as in FIG. 2, showing the location of antenna enclosure under a seat.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

FIGS. 1-14 show aspects of an enclosure 20 having an antenna 22 mounted via an antenna bracket 24. Enclosure 20 is mounted via brackets 26a,26b in a seating area 28, for example to a seating rail 30 to which one or more seats 32 are mounted. While the subject matter of this disclosure finds particular utility in distributed antenna systems providing multi-user access in crowded spaces such as stadiums, arenas, and the like, aspects of the disclosure are useful in other environments, using differently shaped or mounted enclosures, without enclosures, and/or in single antenna installations. Accordingly, no limitation on locations of use or design of systems should be understood based on the disclosure below of use of a particular antenna within a particular enclosures, mounted using particular brackets, beneath a particular rail holding seats within a distributed antenna system.

As shown, enclosure 20 may have walls (right side 20a, left side 20b; top 20c; bottom 20d; and back 20e) defining an interior area 34 and an opening 36. Enclosure 20 may also have a cover 38 attached to opening 36 so as to close the opening, for example via screws, a hinge with a latch, etc. (not shown). If desired, a gasket may also be provided around opening 36 between walls 20a-20d and cover 38. One or more additional openings 40a,40b may be provided, for example respectively thorough walls 20a,20b, for receipt of a communications cable 42 therethrough. Cable 42 may be, for example a coaxial or other communications cable, and may be protected via sheathing 44 and an environmental and/or strain relief protective cable gland 46a,46b at the point of entry into openings 40a,40b.

Enclosure 20 may be a conventional weather tight and corrosion resistant, flame retardant electronics enclosure formed of a polycarbonate material. Preferably, the polycarbonate material, in combination with the antenna, permits wireless communication through the enclosure's walls and cover extending outwardly (generally laterally) for several feet, preferably over 10 feet, or to as many as 15 or 20 feet or more. A NEMA 6P/IP68 rated enclosure with sufficient transmissibility, would provide protections for electronics in a stadium environment, particularly outdoors, but other NEMA or IP rated enclosures could be used, particularly in other applications or locations.

A mounting structure, including one or two of the enclosure brackets 26a,26 or other bracketing, is provided for mounting enclosure 20 in a predetermined orientation. As shown in the figures, the predetermined orientation is such that the antenna can be mounted as desired, as described below.

Each bracket 26a,26b includes a first flange 48 for attachment to the enclosure and a second flange 50 for attachment to an environmental element (in this case rail 30, on which a plurality of seats 32 are mounted). First flange 48 may be attached by screws (not shown) through aligned holes 52 in first flange 48 and holes 54 enclosure 20. Second flange 50 includes a hole 56 (in this case a slot) for receipt of a bolt 58 threadable into a fastener 60 slidably located in a channel 62 of rail 30.

Sliding fastener 60 along channel 62 in rail 30 allows enclosure 20 to be adjusted laterally along the row of seats 32 in a desired position. Forming hole 56 as a slot allows forward and rearward adjustability of enclosure 20 relative to seat 32 and rail 30, for example so that enclosure 20 can be moved rearwardly out of the way of a user of the seat or cleaning personnel when the seat is empty. It may be desirable to be able to move enclosure 20 rearward until it contacts a rear wall 64 of the seating area to which rail 30 is attached, for example by beams 66. Such location provides protection and alignment of enclosure 20.

In some stadiums, rear wall 64 would be part of a single row or multiple row (e.g., three-row) riser structure installed across raker beams and to which rails and seats are mounted. However, other cement, metallic, plastic, etc., structures supporting seats could be employed, and enclosure could be mounted accordingly. Seats can be mounted directly to horizontal walls (floors) and/or vertical walls directly (without a rail), or to either wall surface with a rail. Seats can be fixed or folding. Thus, in some applications the enclosure mounting structure used could be different than shown. Different enclosure designs could also cause corresponding changes in the design of enclosure brackets 26. For example, differing locations of mounting holes 54, cooperating flanges (not shown) on enclosure 20, etc., could dictate changes in enclosure brackets 26.

Enclosure brackets 26 may be configured to reduce blockage of communications of a signal between the antenna 22 and nearby users, for example, by including a reduced profile portion 66 along a side of the enclosure to permit the signal to communicate with nearby users located in seats spaced in a direction generally along the side of the enclosure. As shown, a central reduced profile portion 66 of enclosure brackets 26 between flanges 48 and 50 is generally triangular. Such shape assists in providing space for cable 42 to pass into or out of enclosure, and also prevents reflection or blocking of signals from antenna 22 in lateral directions (as compared to a central portion that covered more or most of side walls 20a,20b). Enclosure brackets 26 can be made of a rigid material, such as corrosion resistant metal such as a T-304 stainless steel, with a thickness of 0.074 in., although other materials and dimensions could be employed.

Antenna bracket 24 is mounted to enclosure 20 in the interior area 34. Antenna bracket 24 is also rigid, and may be formed of the same metal as enclosure brackets 26 or another material. Antenna bracket 24 has an antenna mounting portion 68 with an opening 70 for receiving antenna 22, a bracket mounting portion 72 with holes 74 along a flange 76 aligning with holes 54 of enclosure 20 for mounting the bracket 24 to the enclosure, and a central portion 78 between portions 68 and 72.

Antenna bracket 24 is configured so that when enclosure 20 is mounted in the predetermined orientation, a ground plane 80 of antenna 22 extends along a non-horizontal plane. As shown, ground plane 80 is directed at about 45 degrees from horizontal. Ground plane 80 may comprise all or a portion of antenna mounting portion 68 around opening 70 with a diameter sufficient to function as a ground plane for antenna 22. Alternatively, antenna 22 may include its own ground plane element, or a separate ground plane element may be attached between bracket 26 and antenna during installation. Use of such a ground plane assists with providing desired coverage so that an omni-directional antenna may be employed.

Antenna bracket 24 may have various shapes including at least one bend 82 in order to achieve the desired ground plane angle. Assuming enclosure is generally rectangular and mounted to rail 30, rear wall 64, or adjacent floor portion, antenna bracket 24 may be mounted to one of walls 20a-20e, with at least one bend 82.

Figure 6:
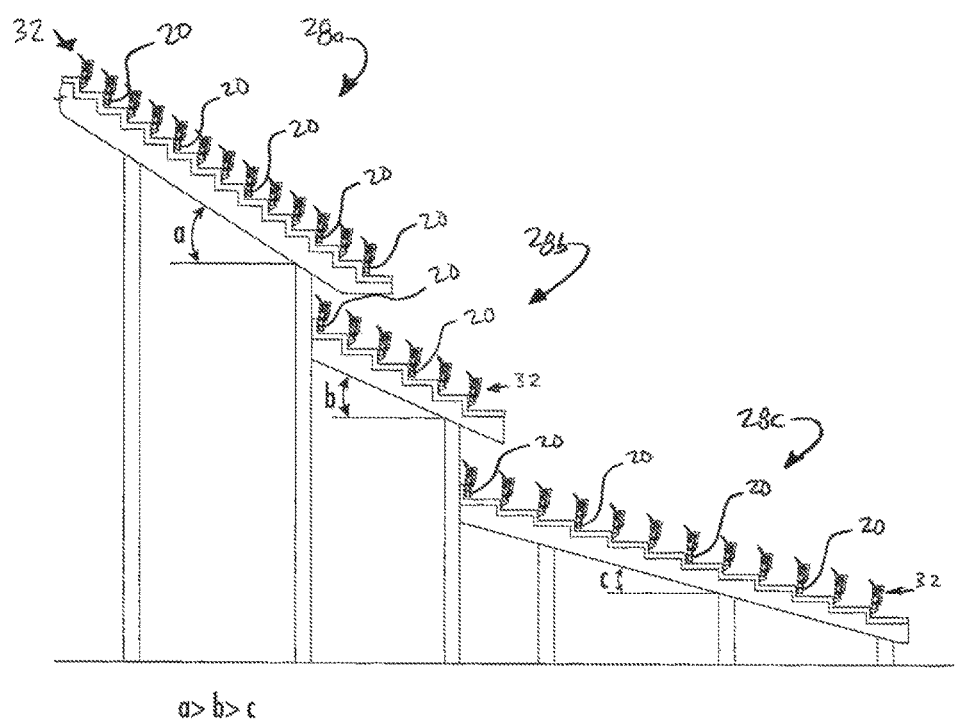
FIG. 6 is a side schematic view of a stadium having multiple decks showing distribution of antenna enclosures.

Bracket 24 and bend 82 may be configured to permit selective adjustment of an orientation of antenna mounting portion 68 relative to the non-horizontal plane in which the ground plane is located (e.g., by bending bracket 24 at installation). If so, bend 82 may including a surface irregularity to improve bendability along the bend. The surface irregularity may be at least one opening extending through antenna bracket 24 along bend 82, for example, a plurality of stitch-cut openings 84 along the bend. Such openings 84 form a preferential bend zone and prevent bracket 24 from being bent in other undesirable locations. As shown in FIG. 6, different seating areas 28a, 28b, 28c may have different pitches (angles, a, b, and c) between rows.

Figure 7:
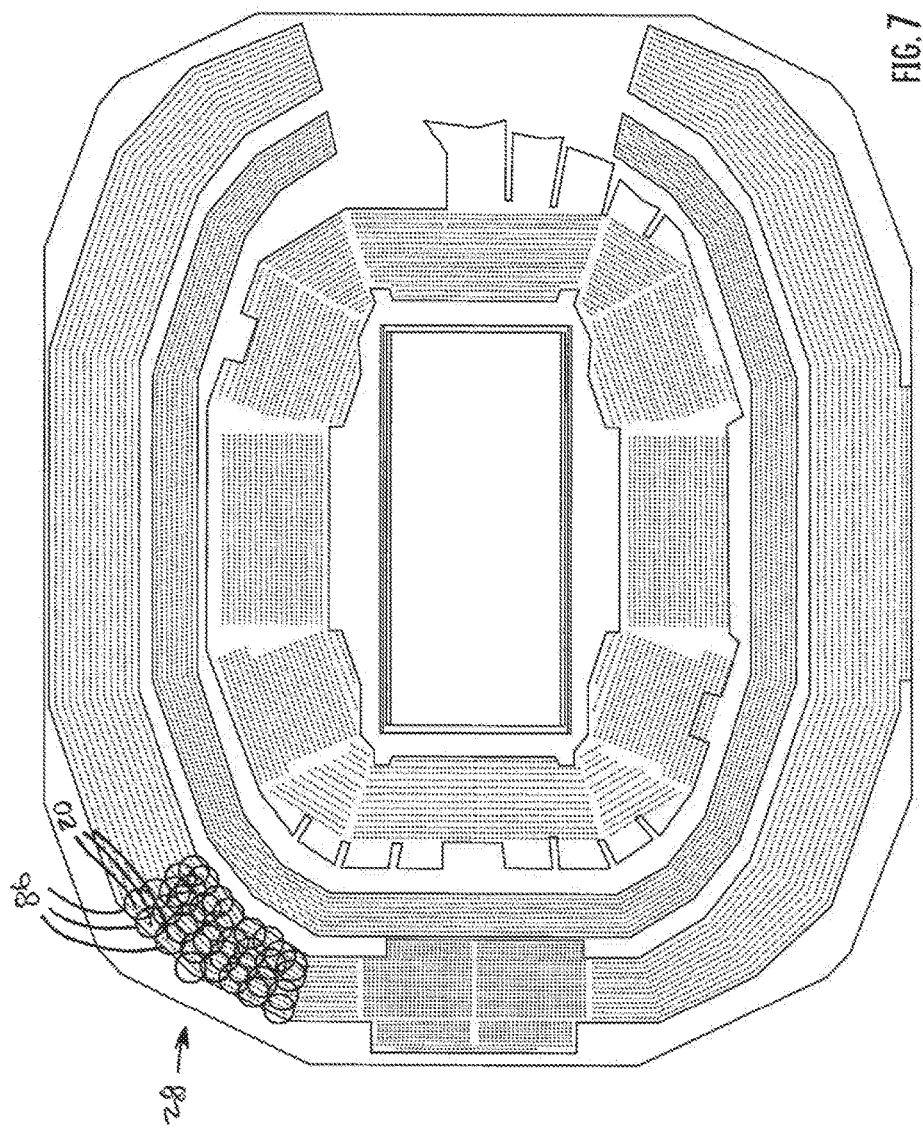
FIG. 7 is a top schematic view of a stadium showing distribution of antenna enclosures in one section.
Figure 8:
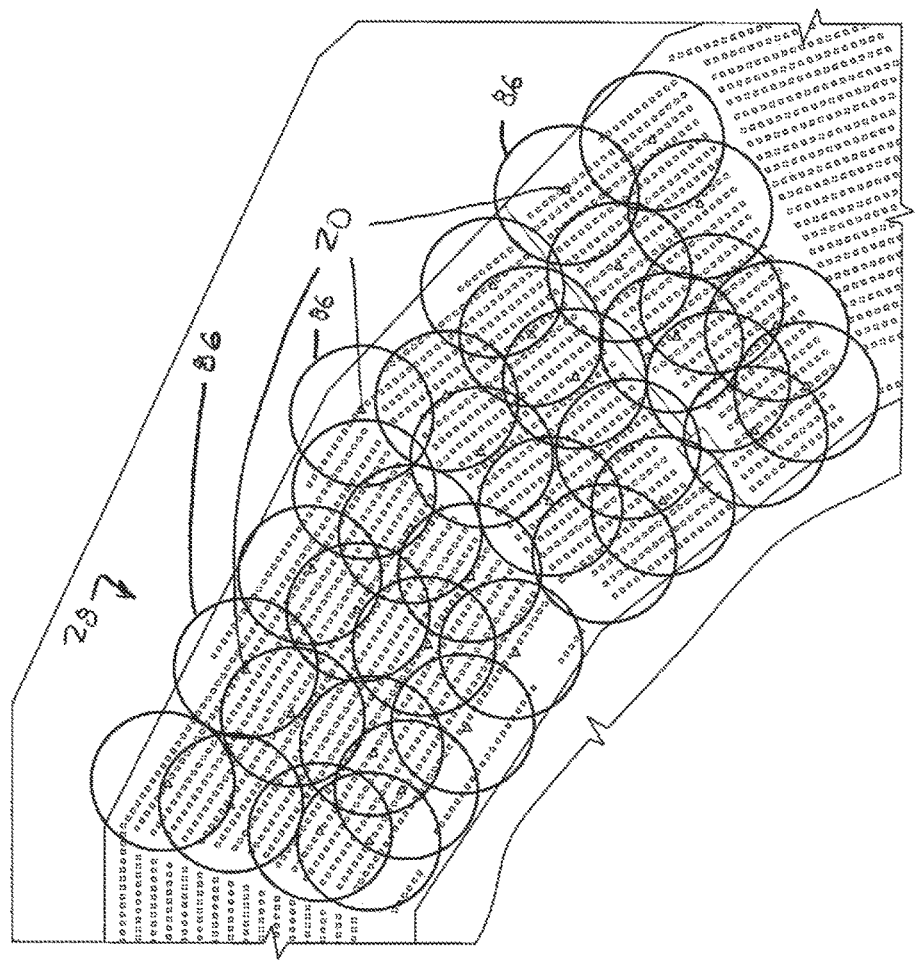
FIG. 8 is a top schematic view of the section of FIG. 7.
Figure 9:
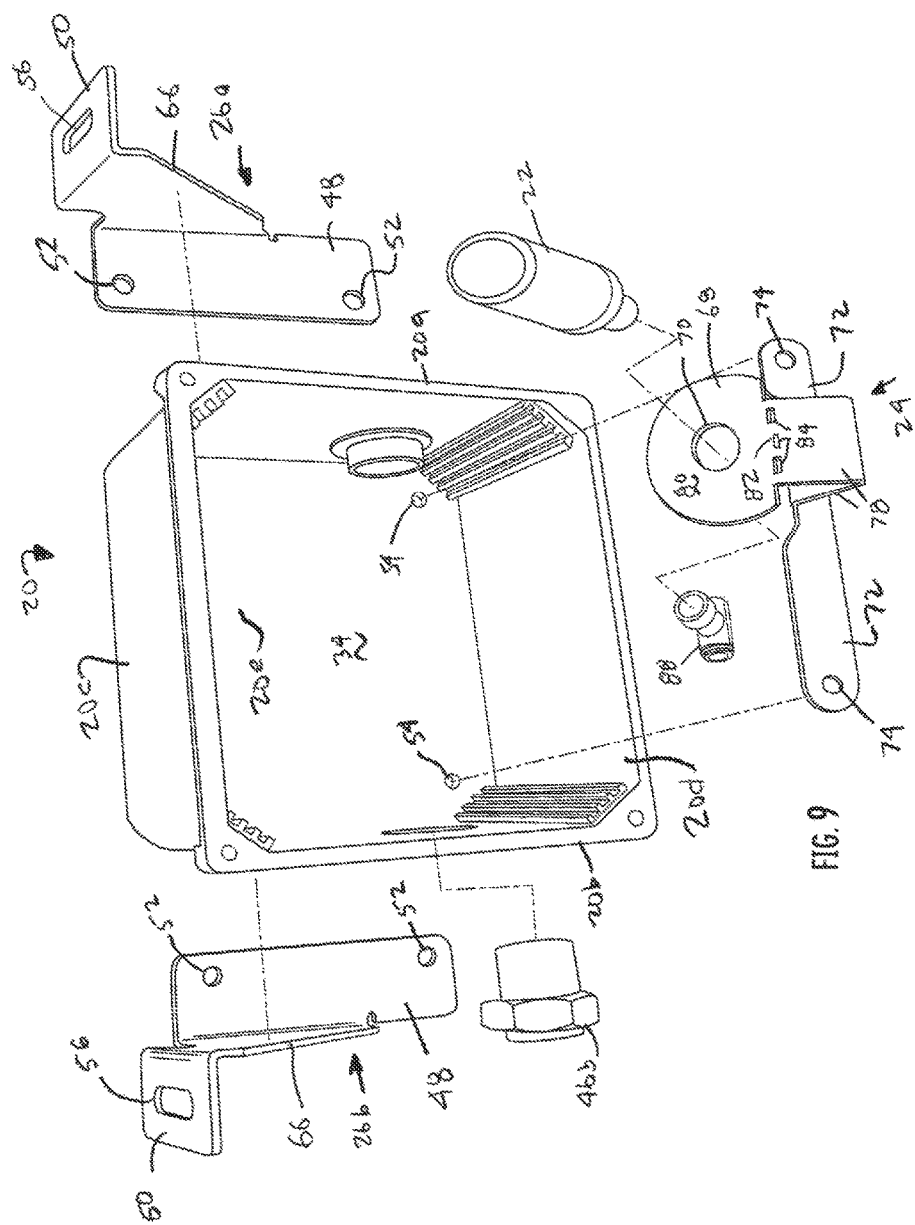
FIG. 9 is an exploded isometric view of an antenna enclosure with its cover removed.
Figure 10:
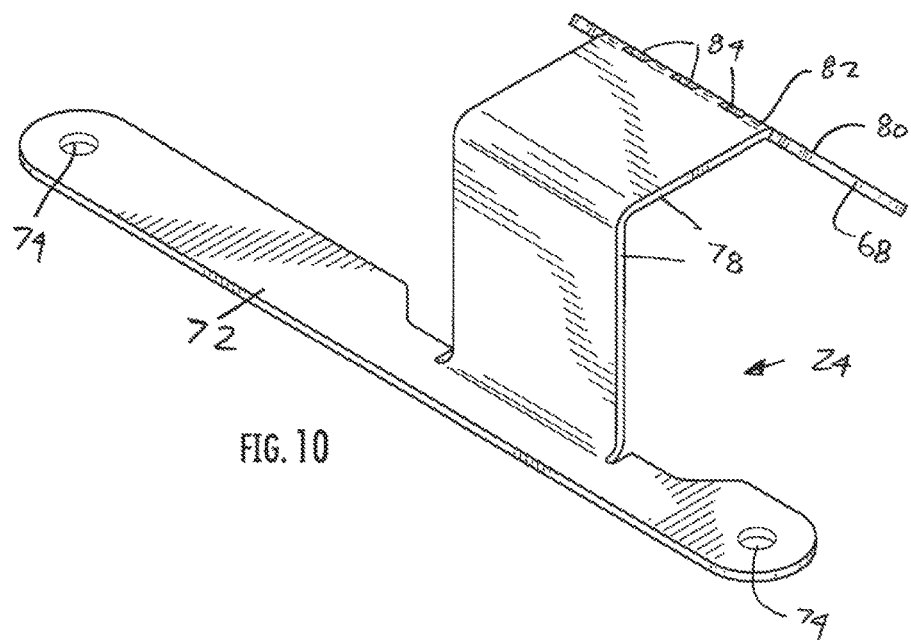
FIG. 10 is an isometric view of the antenna bracket of FIG. 9.
Figure 11:
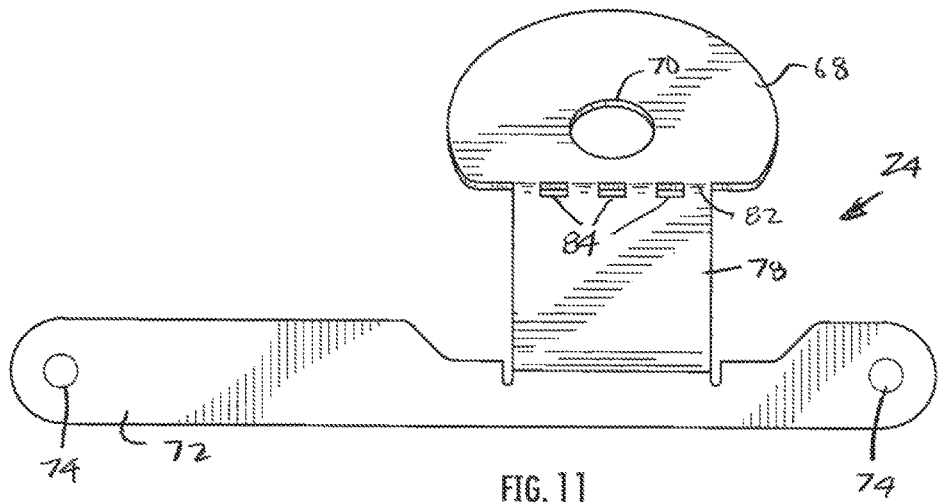
FIG. 11 is a front view of the antenna bracket of FIG. 9.
Figure 12:
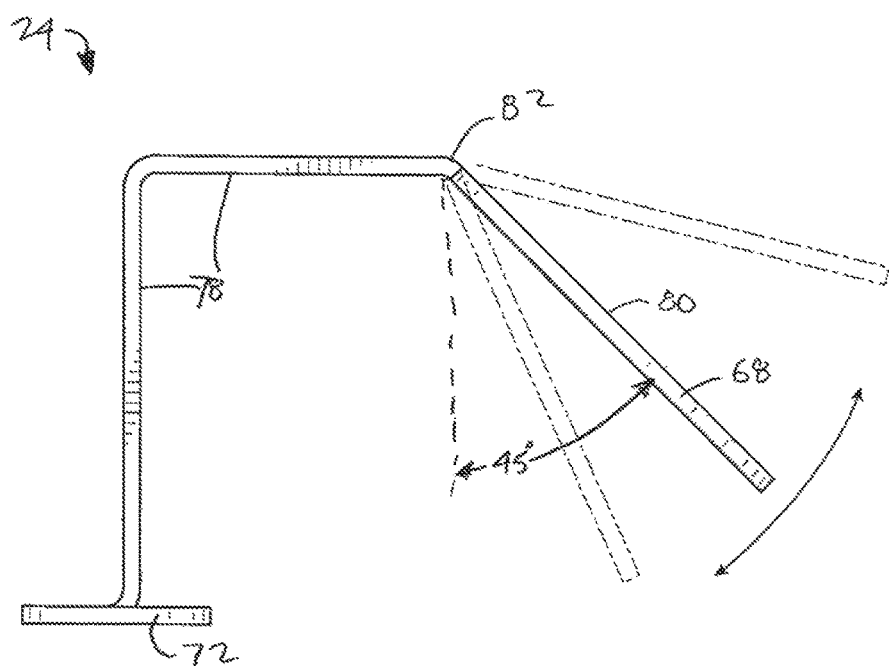
FIG. 12 is a side view of the antenna bracket of FIG. 9, showing adjustability of the antenna mounting portion/ground plane.

Bendability of antenna brackets 24 allows a single bracket to be manufactured then adjusted upon installation to extend along a non-horizontal plane related to the angle of seating row pitch (perhaps matching the pitch, perhaps askew to the pitch, but in any event non-horizontal if the seating is pitched) so that a signal of the antenna is available to seats within multiple rows located in front of and behind the enclosure, as well as laterally. FIGS. 7 and 8 show an example of how several enclosures 20 can be provided in a given area of pitched upper deck seating to provide overlapping coverage zones to provide coverage to all of the seating therein. Enclosures need not be placed under every seat, nor in every row. By using an antenna bracket 24 within enclosures 20 to orient antennas 22 therein at an angle related to the seating pitch angle, front and rear coverage is enhanced for each antenna and fewer enclosures are thus required for a given area of seating. It would also be possible to design an enclosure having a desired angled surface so that bracket 24 could be linear from enclosure to antenna and achieve a desired antenna pitch.

Antenna 22 may be various types of communication antennas useful for current and future types of communications devices. Thus, 3G, 4G, 5G, WiFi, WiMax, or other communication protocols and bandwidths can be employed. One currently available antenna that is suitable is a 4G/3G Multiband Phantom® Antenna, Model NO. TRA6927M3, available from Laird, Inc. Such antenna may be to opening 70 using standard threading and a nut, and may be attached to cable 42 or an adapter using a type N or NMO connector, or others. Each enclosure may be connected to a single cable, or enclosures may be connected in series, depending on the particular installation location.

In view of the above, various examples and aspects of communications systems, antennas, enclosures, distributed antenna systems, and components thereof are set forth.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

We claim:

1. A communications device for mounting to an environmental element comprising:
   an enclosure having walls defining an interior area and an opening, the walls including at least one first wall and at least one second wall;
   a cover attachable to the opening so as to close the opening;
   mounting structure for mounting the enclosure to the environmental element in a predetermined orientation so that the first wall is oriented in a vertically and the second wall is oriented horizontally;
   an antenna bracket having a bracket mounting portion with a flange, a first bend adjacent the bracket mounting portion, a central portion having a first leg, a second leg, and a second bend between the first leg and the second leg, the antenna bracket also having an antenna mounting portion and a third bend between the antenna mounting portion and the second leg, the first leg adjacent the first bend extending substantially perpendicular to the bracket mounting portion, the second leg extending substantially perpendicular to the first leg and substantially parallel to the bracket mounting portion, the antenna bracket being mounted via the bracket mounting portion to at least one of the first wall and the second wall in the interior area, the antenna bracket being a unitary metallic element; and
   an antenna mounted to the antenna mounting portion of the antenna bracket, the third bend being configured so that the antenna mounting portion and the second leg are substantially non-perpendicular and so that when the enclosure is mounted in the predetermined orientation a ground plane of the antenna extends along a non-horizontal plane, the third bend including a surface irregularity in the form of at least one opening extending through the antenna bracket along the third bend to weaken the antenna bracket along the third bend for preferential bending along the third bend rather than along the first bend or the second bend for selective adjustment of an orientation of the antenna mounting portion and the ground plane.

2. The communications device of claim 1, wherein the ground plane is located in the antenna mounting portion.

3. The communications device of claim 1, wherein the antenna is an omnidirectional antenna.

4. The communications device of claim 3, wherein the antenna is a mobile telephone communication antenna.

5. The communications device of claim 1, wherein the enclosure includes at least one opening through at least one of the walls, a communications cable extending through the opening, the communications cable being electrically connected to the antenna.

6. The communications device of claim 5, wherein each opening has an associated gland through which the communications cable enters the enclosure.

7. The communications device of claim 1, wherein the surface irregularity includes a plurality of stitch-cut openings along the at least one bend.

8. The communications device of claim 1, wherein the mounting structure includes at least one enclosure bracket for mounting the enclosure in the predetermined orientation.

9. The communications device of claim 8, wherein the at least one enclosure bracket includes a first flange for attachment to the enclosure and a second flange for attachment to the environmental element.

10. The communications device of claim 9, wherein the environmental element is a rail to which a plurality of seats may be mounted, the at least one enclosure bracket mounting the enclosure to the rail generally lower that the seats.

11. The communications device of claim 10, wherein the at least one enclosure bracket is configured to reduce blockage of communications of a signal between the antenna and nearby users.

12. The communications device of claim 11, wherein the at least one enclosure bracket includes a reduced profile portion along a side of the enclosure to permit the signal to communicate with nearby users located in seats spaced in a direction generally along the side of the enclosure.

13. The communications device of claim 1, wherein the environmental element is located in a seating environment having multiple rows of seats arranged with a pitch between each adjacent pair of the rows, the mounting structure mounts the enclosure to the environmental element in a predetermined orientation along a row within the multiple rows of seats, the antenna bracket being configured so that when the enclosure is mounted in the predetermined orientation a ground plane of the antenna extends along a non-horizontal plane related to the pitch so that a signal of the antenna is available to seats within the multiple rows located in front of and behind the enclosure.

14. The communications device of claim 13, wherein the mounting structure includes at least one enclosure bracket for mounting the enclosure to the environmental element in the predetermined orientation, the environmental element being a rail to which a plurality of seats may be mounted, the at least one enclosure bracket mounting the enclosure to the rail generally lower that the seats and being configured to reduce blockage of communications of a signal between the antenna and nearby users.

15. The communications device of claim 14, wherein the at least one enclosure bracket includes a reduced profile portion along a side of the enclosure to permit the signal to communicate with nearby users located in seats spaced in a direction generally along the side of the enclosure.

16. The communications device of claim 13, wherein the non-horizontal plane is angled from a horizontal direction by an amount substantially corresponding to the pitch.

17. A communications system including a plurality of the communications devices of claim 13 distributed throughout the multiple rows so as to provide coverage to at least a substantial amount of the seats in the seating environment.

18. An antenna mounting bracket for a mounting an antenna of a communications device in an enclosure having walls defining an interior area, the enclosure configured to be mounted to an environmental element in a predetermined orientation, the antenna mounting bracket including a unitary metallic element comprising:
   a bracket mounting portion with a flange, a first bend adjacent the bracket mounting portion, a central portion having a first leg, a second leg, and a second bend between the first leg and the second leg, an antenna mounting portion and a third bend between the antenna mounting portion and the second leg, the first leg adjacent the first bend extending substantially perpendicular to the bracket mounting portion, the second leg extending substantially perpendicular to the first leg and substantially parallel to the bracket mounting portion, the antenna bracket being mountable to one of the walls of the enclosure via the bracket mounting portion, the third bend being configured so that the antenna mounting portion and the second leg are substantially non-perpendicular, the third bend including a surface irregularity in the form of at least one opening extending through the antenna bracket along the third to weaken the antenna bracket along the third bend for preferential bending along the third bend rather than along the first bend or the second bend for selective adjustment of an orientation of the antenna mounting portion relative to the second leg.

19. An antenna mounting bracket as in claim 18, wherein the surface irregularity includes a plurality of stitch-cut openings along the third bend.

\* \* \* \* \*